(12) United States Patent
Abood et al.

(10) Patent No.: US 11,545,052 B1
(45) Date of Patent: Jan. 3, 2023

(54) INSULATIVE RESCUE CAP CONTAINING EMERGENCY RESPONSE PROCEDURES

(71) Applicants: David G. Abood, Rocky River, OH (US); Paul Saluan, Hinkley, OH (US)

(72) Inventors: David G. Abood, Rocky River, OH (US); Paul Saluan, Hinkley, OH (US)

(73) Assignee: EQUALIZER TECHNOLOGY LLC, Cleveland, OH (US)

( * ) Notice: Subject to any disclaimer, the term of this patent is extended or adjusted under 35 U.S.C. 154(b) by 232 days.

(21) Appl. No.: 13/692,060

(22) Filed: Dec. 3, 2012

Related U.S. Application Data (63) Continuation-in-part of application No. 12/649,887, filed on Dec. 30, 2009, now Pat. No. 10,219,568.

(51) Int. Cl.
*A42B 1/018* (2021.01)
*G09B 23/28* (2006.01)

(52) U.S. Cl.
CPC .................... *G09B 23/288* (2013.01)

(58) Field of Classification Search
CPC .... A42B 1/12; A42B 1/00; A42B 1/04; A63B 33/00; B63C 9/00; G09B 23/288; A41D 23/00; A42C 5/00
See application file for complete search history.

(56) References Cited

U.S. PATENT DOCUMENTS

| | | | | |
|---|---|---|---|---|
| 430,003 A * | 6/1890 | De Lacy | ................ | A42B 1/012 2/209.5 |
| 1,426,402 A * | 8/1922 | Moore | ...................... | B63C 9/15 2/200.2 |
| 1,798,024 A * | 3/1931 | McBride | .................. | A42B 1/12 2/68 |
| 1,819,558 A * | 8/1931 | Husman | .................... | A42B 1/12 D2/880 |
| 2,193,271 A * | 3/1940 | Cowherd | ............... | A42B 1/049 D24/189 |
| 2,417,323 A * | 3/1947 | Richards | ................. | A42B 1/12 D2/867 |
| 2,644,949 A * | 7/1953 | Greenberg | ........... | A42B 1/0189 2/172 |
| 2,726,398 A * | 12/1955 | Cooper | .................... | A42B 1/12 2/174 |
| 2,885,683 A * | 5/1959 | Lipkin | ................. | A42B 1/0186 2/172 |
| 2,983,925 A * | 5/1961 | Gettinger | ............... | A42B 1/049 2/204 |
| D190,849 S * | 7/1961 | Rudolph | ........................ | D2/880 |
| 3,296,582 A * | 1/1967 | Ide | ........................ | G10K 11/002 181/175 |
| 3,321,774 A * | 5/1967 | Tames | .................... | A42B 1/012 2/181 |

(Continued)

FOREIGN PATENT DOCUMENTS

CN 208492454 U * 2/2019
CN 209827187 U * 12/2019

(Continued)

*Primary Examiner* — Richale L Quinn
(74) *Attorney, Agent, or Firm* — Gugliotta & Gugliotta LPA (57) ABSTRACT

The present invention relates generally to a device and a method that maintains an individual's body temperature during exposure to cold conditions or cold water and, more specifically, to an insulative rescue cap that clearly provides instructions and teachings of how to correctly perform emergency medical procedures, namely CPR. The cap is contoured to the individual's head.

19 Claims, 12 Drawing Sheets

(56) References Cited

U.S. PATENT DOCUMENTS

| | | | | |
|---|---|---|---|---|
| D214,482 S * | 6/1969 | Zimmon et al. | ............... | D2/867 |
| 3,512,181 A * | 5/1970 | Osborne | ................ | A42B 1/012 |
| | | | | D2/881 |
| 3,555,565 A * | 1/1971 | Zimmon et al. | ........ | A42B 1/012 |
| | | | | 2/195.7 |
| 3,699,590 A * | 10/1972 | Webber | ................. | A41D 31/26 |
| | | | | 361/220 |
| 3,872,516 A * | 3/1975 | Bird | ..................... | A42B 1/045 |
| | | | | 2/202 |
| 4,061,898 A * | 12/1977 | Murray | ................. | A42B 1/008 |
| | | | | 219/549 |
| D258,696 S * | 3/1981 | Evans | ............................ | D2/868 |
| 4,491,985 A * | 1/1985 | Dalton | ................... | A42B 1/041 |
| | | | | 2/209.12 |
| 4,552,149 A * | 11/1985 | Tatsuki | ..................... | A61F 7/10 |
| | | | | 607/110 |
| 4,572,173 A * | 2/1986 | Comeau | ................. | A61B 46/00 |
| | | | | 2/202 |
| 4,951,319 A * | 8/1990 | Phillips, Jr. | ............... | A42B 7/00 |
| | | | | 2/209.12 |
| 4,998,296 A * | 3/1991 | Stames | ................. | A41D 15/04 |
| | | | | 2/84 |
| 5,197,292 A * | 3/1993 | McPherson | ........... | A42B 1/008 |
| | | | | 62/530 |
| 5,253,368 A * | 10/1993 | Blake | ..................... | B43K 29/00 |
| | | | | 40/329 |
| RE35,290 E * | 7/1996 | Druskoczi | ............... | A61F 5/055 |
| | | | | 602/18 |
| 5,557,807 A * | 9/1996 | Hujar | ..................... | A42B 1/0187 |
| | | | | 2/209.13 |
| 5,565,154 A * | 10/1996 | McGregor | ............. | D04H 1/413 |
| | | | | 264/510 |
| 5,594,956 A * | 1/1997 | Barrientos | ............... | A42B 1/22 |
| | | | | 2/172 |
| 5,850,636 A * | 12/1998 | Reuven | .................. | A42B 1/008 |
| | | | | 2/200.1 |
| 5,884,760 A * | 3/1999 | Carpenter | ................ | A62B 3/00 |
| | | | | 2/88 |
| 5,887,285 A * | 3/1999 | McCormick | ............ | A42C 5/04 |
| | | | | 2/171.1 |
| 6,014,776 A * | 1/2000 | DeVinzio | ................ | A42B 1/041 |
| | | | | 2/172 |
| 6,112,332 A * | 9/2000 | McCormick | ............ | A42C 5/04 |
| | | | | 2/200.1 |
| 6,247,181 B1 * | 6/2001 | Hirsch | ................... | A42B 1/041 |
| | | | | 2/412 |
| 6,421,832 B1 * | 7/2002 | Ondrejko | ................ | A41D 1/04 |
| | | | | 2/69 |
| 6,427,685 B1 * | 8/2002 | Ray, II | ................ | G09B 23/288 |
| | | | | 434/262 |
| 6,467,096 B1 * | 10/2002 | Coluccio | ................ | A42B 1/22 |
| | | | | 2/195.2 |
| D473,365 S * | 4/2003 | Bias | ............................... | D2/867 |
| 6,543,061 B1 * | 4/2003 | Morgan | .................. | A42B 1/22 |
| | | | | 2/183 |
| 6,557,179 B1 * | 5/2003 | Reuven | ................. | A42B 1/008 |
| | | | | 2/209 |
| 6,751,805 B1 * | 6/2004 | Austion | ................. | A41D 27/08 |
| | | | | 2/94 |
| 6,820,283 B2 * | 11/2004 | Graneto, III | ........... | A45D 19/14 |
| | | | | 2/171.2 |
| 6,904,617 B2 * | 6/2005 | Tsai | ........................... | F25D 7/00 |
| | | | | 2/209.13 |
| 6,948,189 B2 * | 9/2005 | Early | ........................ | A42C 5/04 |
| | | | | 2/209.5 |
| 6,966,068 B2 * | 11/2005 | Johnson | ................. | A42B 1/12 |
| | | | | 2/200.2 |
| D517,284 S * | 3/2006 | Black | ............................ | D2/867 |
| 7,310,553 B2 * | 12/2007 | Freeman | ................. | A61N 1/3987 |
| | | | | 601/41 |
| 7,401,365 B2 * | 7/2008 | Neal | ..................... | A42B 3/0406 |
| | | | | 40/329 |
| D584,000 S * | 12/2008 | Saluan | .......................... | D29/106 |
| 7,744,640 B1 * | 6/2010 | Faries, Jr. | ................ | A61F 7/007 |
| | | | | 607/108 |
| 7,930,768 B1 * | 4/2011 | Tyler | ...................... | A42B 1/041 |
| | | | | 2/205 |
| 8,744,573 B2 * | 6/2014 | Freeman | ............... | A61H 31/004 |
| | | | | 600/509 |
| D714,666 S * | 10/2014 | Abood | .......................... | D10/57 |
| 8,850,616 B1 * | 10/2014 | Hoover | ................... | A41D 31/125 |
| | | | | 2/170 |
| 9,578,914 B2 * | 2/2017 | Fierro | ..................... | A63B 33/00 |
| 10,154,941 B2 * | 12/2018 | Freeman | .................... | A61N 1/0492 |
| 10,219,568 B1 * | 3/2019 | Saluan | .................. | A42B 1/012 |
| 10,244,802 B2 * | 4/2019 | Gibson | .................. | A41D 27/08 |
| 2001/0047140 A1 * | 11/2001 | Freeman | ............... | A61N 1/0492 |
| | | | | 601/41 |
| 2003/0066120 A1 * | 4/2003 | Tremblay-Lutter | ........................ | |
| | | | | A41D 19/001 |
| | | | | 2/164 |
| 2004/0116822 A1 * | 6/2004 | Lindsey | .................. | G01K 13/20 |
| | | | | 374/E1.004 |
| 2004/0163162 A1 * | 8/2004 | Benziger | ................ | A63B 23/025 |
| | | | | 2/413 |
| 2005/0034215 A1 * | 2/2005 | Harrison | ................... | A42C 5/04 |
| | | | | 2/207 |
| 2005/0183182 A1 * | 8/2005 | Keenan | .................. | A61B 90/04 |
| | | | | 2/114 |
| 2005/0278824 A1 * | 12/2005 | Gadot | .................... | A41D 27/02 |
| | | | | 2/108 |
| 2005/0280531 A1 * | 12/2005 | Fadem | ................. | A61B 5/6833 |
| | | | | 600/323 |
| 2006/0264725 A1 * | 11/2006 | Hannula | ................ | A61B 5/6804 |
| | | | | 600/340 |
| 2007/0000024 A1 * | 1/2007 | Kozul | .................... | A42B 1/041 |
| | | | | 2/171 |
| 2007/0006364 A1 * | 1/2007 | Brewer | ................ | A42B 1/0189 |
| | | | | 2/171 |
| 2007/0157358 A1 * | 7/2007 | Sharon | ...................... | G09F 3/02 |
| | | | | 2/69 |
| 2008/0146958 A1 * | 6/2008 | Guillory | ............... | A61B 5/4094 |
| | | | | 600/544 |
| 2009/0091120 A1 * | 4/2009 | Welsh | ........................ | G09F 3/10 |
| | | | | 156/277 |
| 2009/0253996 A1 * | 10/2009 | Lee | .......................... | A61B 5/16 |
| | | | | 600/544 |
| 2010/0024091 A1 * | 2/2010 | Mehtab | .................. | A42B 1/206 |
| | | | | 2/244 |
| 2010/0076337 A1 * | 3/2010 | Medina | ................ | A61B 5/6804 |
| | | | | 2/171.2 |
| 2011/0010823 A1 * | 1/2011 | Horgan | .................. | A42B 1/017 |
| | | | | 2/171 |
| 2012/0204306 A1 * | 8/2012 | Fierro | ...................... | A42B 1/12 |
| | | | | 2/68 |
| 2013/0088005 A1 * | 4/2013 | Henshaw | .................. | B44C 1/16 |
| | | | | 283/34 |
| 2014/0026284 A1 * | 1/2014 | Yates | ....................... | A63B 33/00 |
| | | | | 2/67 |
| 2014/0137310 A1 * | 5/2014 | Malone | .................... | A42B 1/008 |
| | | | | 525/425 |
| 2014/0317820 A1 * | 10/2014 | Fierro | ...................... | A42B 1/12 |
| | | | | 2/68 |
| 2014/0338099 A1 * | 11/2014 | Marscellas | ............... | A42B 1/012 |
| | | | | 2/209.13 |
| 2015/0164150 A1 * | 6/2015 | Gibson | .................... | A41D 1/04 |
| | | | | 2/69 |
| 2015/0228205 A1 * | 8/2015 | Koskimaki | ............... | A61B 5/742 |
| | | | | 128/202.28 |
| 2018/0169358 A1 * | 6/2018 | Jackson | ................. | G09B 23/288 |

FOREIGN PATENT DOCUMENTS

| | | | |
|---|---|---|---|
| GB | 2429631 A * | 3/2007 | ............. A41D 27/08 |
| WO | WO-0156652 A1 * | 8/2001 | ............ A61H 31/004 |
| WO | WO-2020149861 A1 * | 7/2020 | ............. A42B 1/017 |

* cited by examiner

INSULATIVE RESCUE CAP CONTAINING EMERGENCY RESPONSE PROCEDURES

RELATED APPLICATIONS

The present application is a Continuation in Part of currently pending U.S. Ser. No. 12/649,887 filed on Dec. 30, 2009 and incorporated by reference herein as if fully rewritten.

BACKGROUND OF THE INVENTION

1. Field of the Invention

The present invention relates generally to a device and a method that maintains a individual's body temperature during exposure to cold temperatures and, more specifically, to an insulative rescue cap containing emergency response procedure that is contoured to the individual's head.

2. Description of the Related Art

Individuals that plunge into cold waters experience some level of hypothermia. Extreme levels of hypothermia can be extremely detrimental to brain functions and even fatal.

The decrease in temperature is variable, but decreasing temperatures occur when an individual is exposed longer or in colder conditions. worsens in the procedures that involve larger and lengthier surgical exposures. The state of relative hypothermia can significantly and adversely affect an individual after significant exposure to cold.

However, due to physical and logistical limitations, it is difficult to continuously monitor and control an individual's body temperature at most times after exposure to cold temperatures or cold water.

A person suffering from hypothermia as a result of continued exposure to cold temperature is likely to suffer cardiac arrest. Cardiac arrest, (also known as cardiopulmonary arrest or circulatory arrest) is the cessation of normal circulation of the blood due to failure of the heart to contract effectively. Arrested blood circulation prevents delivery of oxygen to the body. Lack of oxygen to the brain causes loss of consciousness, which then results in abnormal or absent breathing. Brain injury is likely if cardiac arrest goes untreated for more than five minutes. For the best chance of survival and neurological recovery, immediate and decisive treatment is imperative.

Currently, the most accepted immediate and decisive treatment is cardiopulmonary resuscitation (CPR) to provide circulatory support, followed by defibrillation if a shockable rhythm is present.

CPR is an emergency medical procedure which is performed in an effort to manually preserve intact brain function until further measures are taken to restore spontaneous blood circulation and breathing in a person in cardiac arrest. It is indicated in those who are unresponsive with no breathing or abnormal breathing, for example agonal respirations. It may be performed both in and outside of a hospital.

CPR involves chest compressions at least 5 cm deep and at a rate of at least 100 per minute in an effort to create artificial circulation by manually pumping blood through the heart. In addition, the rescuer may provide breaths by either exhaling into the subject's mouth or nose or utilizing a device that pushes air into the subject's lungs. This process of externally providing ventilation is termed artificial respiration. Current recommendations place emphasis on high-quality chest compressions over artificial respiration; a simplified CPR method involving chest compressions only is recommended for untrained rescuers.

CPR alone is unlikely to restart the heart; its main purpose is to restore partial flow of oxygenated blood to the brain and heart. The objective is to delay tissue death and to extend the brief window of opportunity for a successful resuscitation without permanent brain damage. Administration of an electric shock to the subject's heart, termed defibrillation, is usually needed in order to restore a viable or "perfusing" heart rhythm. Defibrillation is only effective for certain heart rhythms, namely ventricular fibrillation or pulseless ventricular tachycardia, rather than asystole or pulseless electrical activity. CPR may succeed in inducing a heart rhythm which may be shockable. CPR is generally continued until the subject regains return of spontaneous circulation (ROSC) or is declared dead.

The present invention teaches an insulative rescue cap that is designed both to contour a individual's head and ears and to maintain its position to help decrease the likelihood of hypothermia, and provide instructions to a third party teaching how to implement and perform emergency medical procedures, namely CPR.

SUMMARY OF THE INVENTION

It is an object of the present invention to provide a flexible and a insulative rescue cap that is worn by individuals after being exposed or likely to be exposed to cold conditions to reduce their risk of hypothermia It is an object of the present invention to reduce the risks to hypothermic individuals suffering from cardiac arrest by providing clearly visible instructions to third parties regarding the implementation and performance of emergency medical procedures.

It is an object that the present cap is comprised of an insulative material that is both stretchable and flexible to provide a means for the rescue cap to follow the contour of a head.

It is an object that the present insulative rescue cap is constructed to minimize exposures to fibrous materials and, as such, to remove any habitat for bacterial growth.

It is an object of the present invention to provide such an insulative rescue cap that incorporates the functions use, in combination, with a clear set of instructions displaying how to perform cardiopulmonary resuscitation.

It is envisioned that the present insulative rescue cap includes an insulative inner portion and a shell fabricated from the materials sold under the trademarks THERMALITE®, THINSULATE® or OUTLAST®. More specifically, the cap includes a ceramic fiber material, a commercially synthetic material having fibers that contain a plurality of microencapsulated and paraffinic hydrocarbons (hereinafter a "phase change material") and a synthetic microfiber having a composition approximating 65% olefin and 35% polyester. The cap extends over a greater portion of a individual's forehead, over the individual's ears and behind the head to reach as far as the top of the lumbar spine.

It is an object of the present cap to prevent excessive airflow between the cap material and a individual's head by eliminating the large air gap between the two. This object is accomplished by minimizing the amount of surface area covered by the cap while also retaining the cap on the individual's head.

It is envisioned that a reflective material may be incorporated into the disclosed invention. Reflective materials may be added to the fibrous insulative materials.

It is an object of the present invention to provide a means to adjust the surgical cap to further ensure a close-fit.

It is an object that such means includes gusseted portions with an attachment mechanism selected from the group comprising VELCRO™ or a chemical adhesive having a peel-away protective cover.

It is an object of the present invention to provide a chin strap as a means to ensure the grip of the surgical cap to the head. It is envisioned that the chin strap is attached to the lower right and the lower left aspects of the surgical cap.

It is an object of the present invention to provide clear and highly visible detailed set of instructions regarding the proper way of performing CPR on an adult on one lateral sagittal side and the proper way of performing CPR on a child on the opposing lateral sagittal side.

It is a final object of the present invention to provide all of the advantages that the foregoing objects entail.

BRIEF DESCRIPTION OF THE DRAWINGS

The advantages and the features of the present invention will become better understood with reference to the following more detailed description and the claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1-8.

1. Detailed Description of the Figures

Referring now to FIG. 1-5, a covering unit, generally noted as 10, is shown for covering a individual's head for maintaining the head temperature and core body temperature within euthermic range during or after exposure to cold conditions that would ordinarily cause an individual to suffer hypothermia. The covering unit 10 covers a substantial portion of the head 70, as will be described in greater detail below and forms a multi-part shell component having an inner surface 12 adapted for closely fitting the contours of a individual's head so as to prevent open air space between the head and an inner surface. The shell component further has an outer surface 14, and forming an opening 16 circumscribed by a gripping lower edge 18. This gripping lower edge 18 forms a gripping means for gripping to a individual's head in a manner such as to impede said the head covering unit from coming off of the individual's head during use or while wearing.

Figure 6:
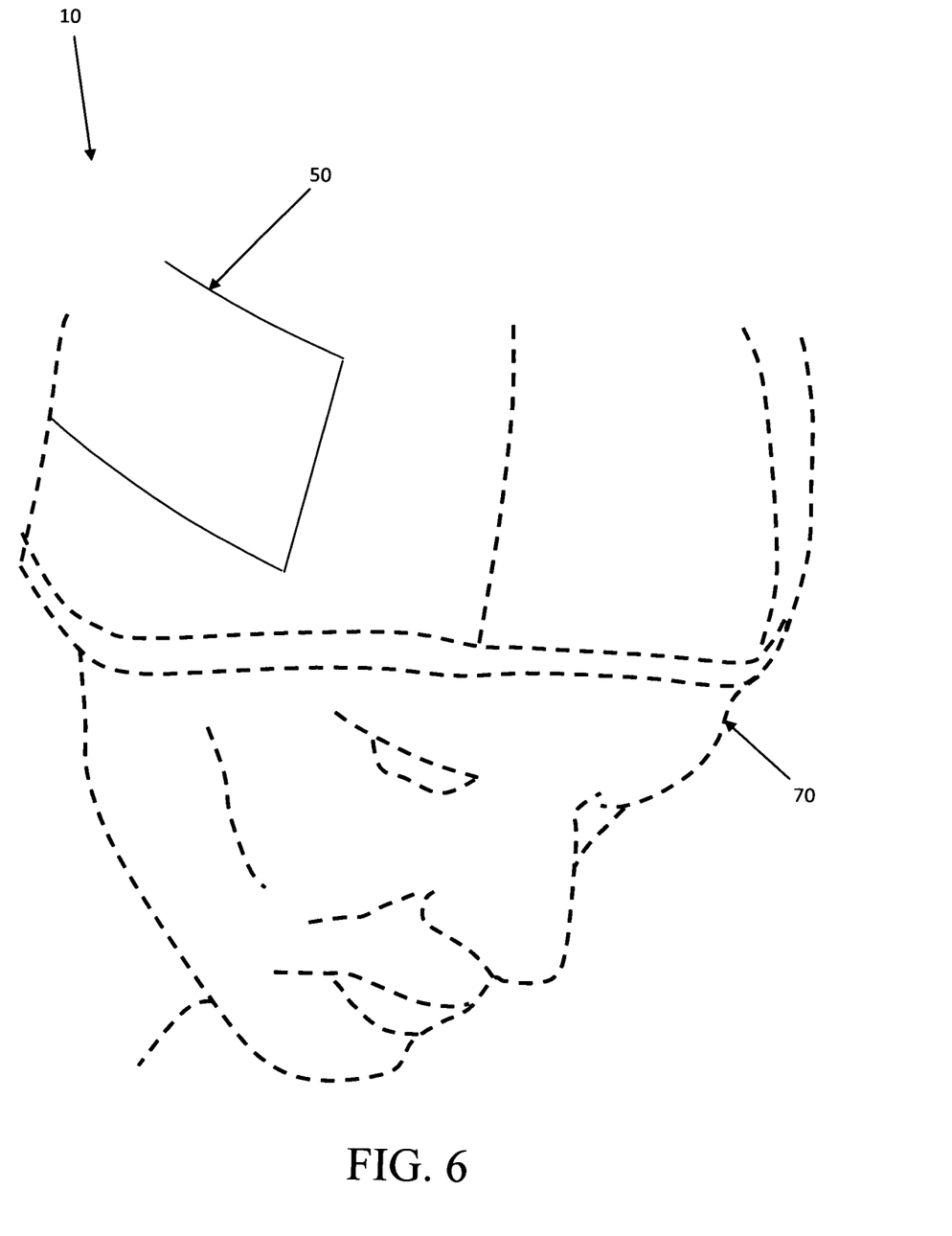
FIG. 6 is a perspective view of a surgical sap to control individual body temperature according to a preferred embodiment of the present invention, wherein the surgical cap is shown in cooperation with a wearer's head; and, FIG. 7-12 are a variety of exemplary emergency rescue procedures that may be displayed on the indicia surface 50. The emergency rescue procedures form no part of the present claims, they are merely presented for descriptive purposes.
Figure 7:
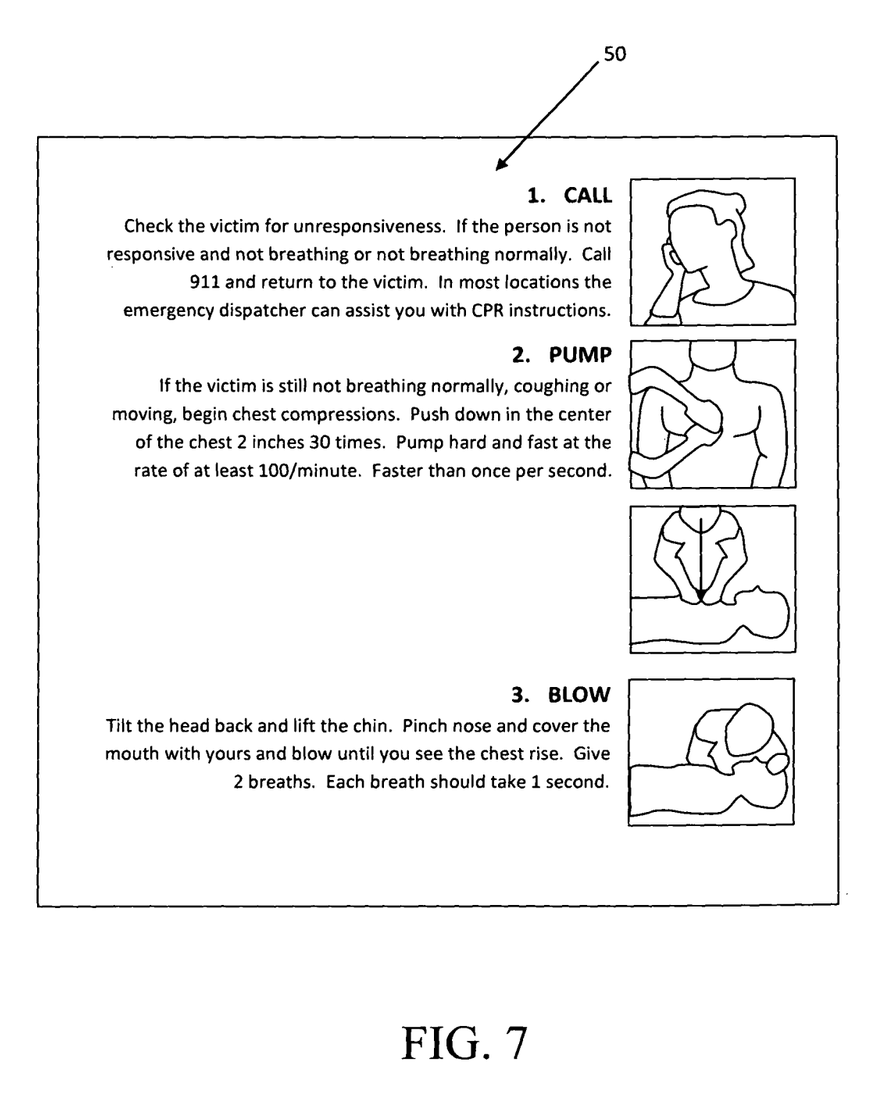
Figure 8:
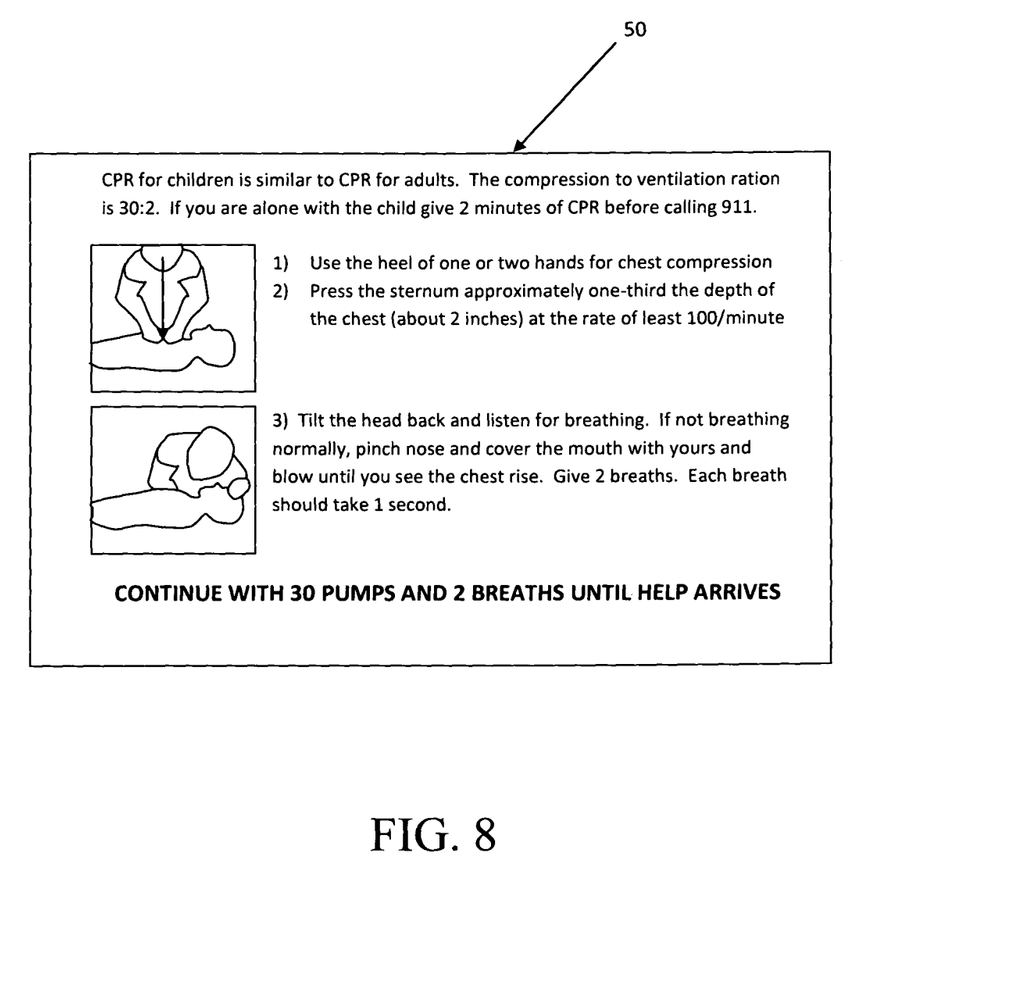
Figure 9:
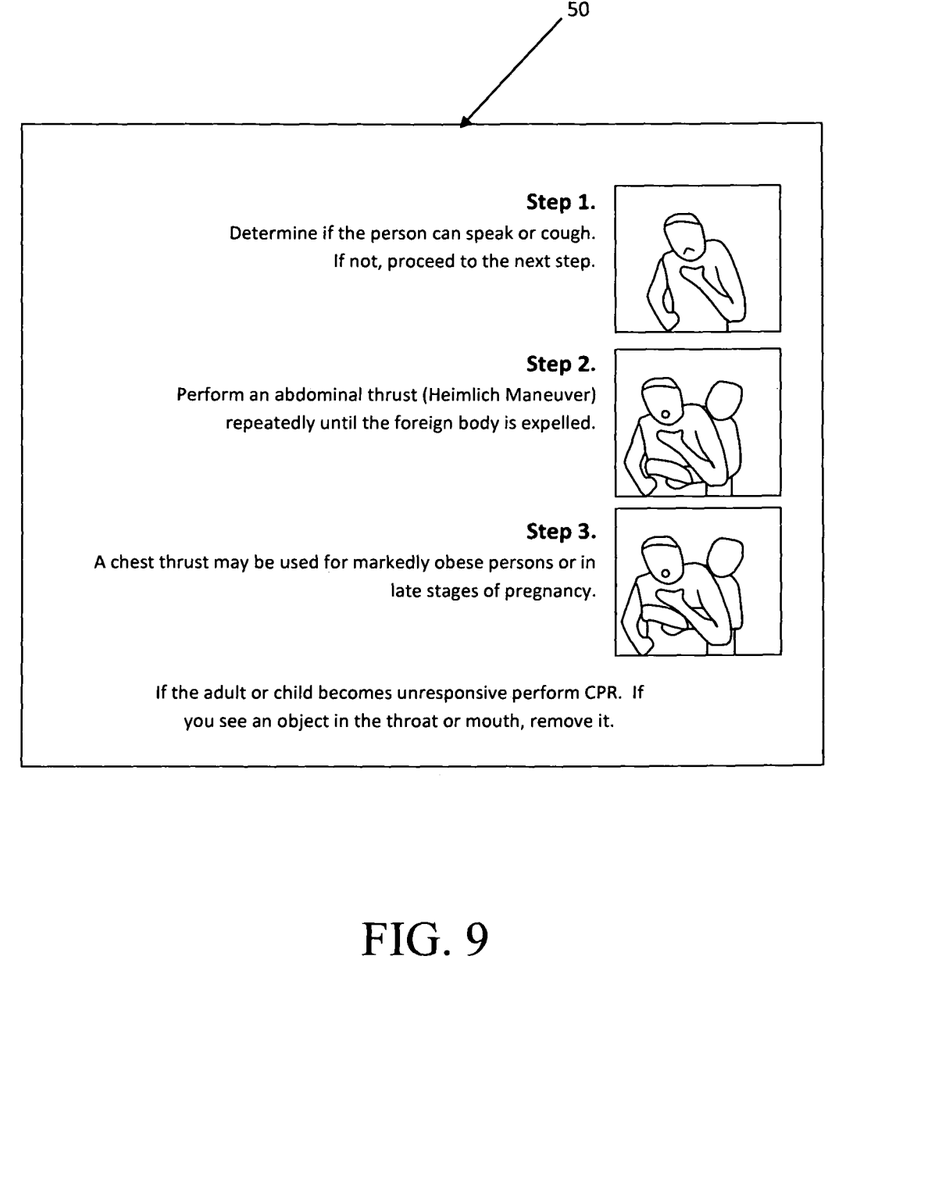
Figure 10:
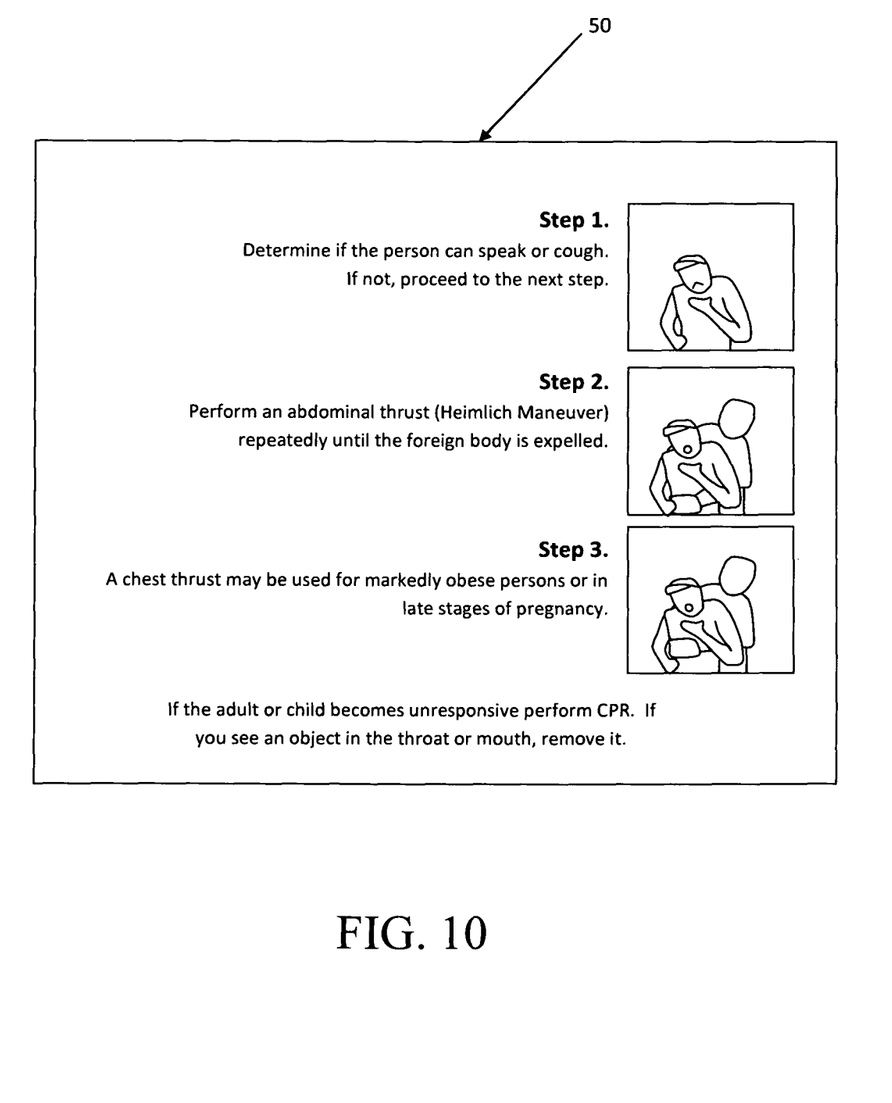
Figure 11:
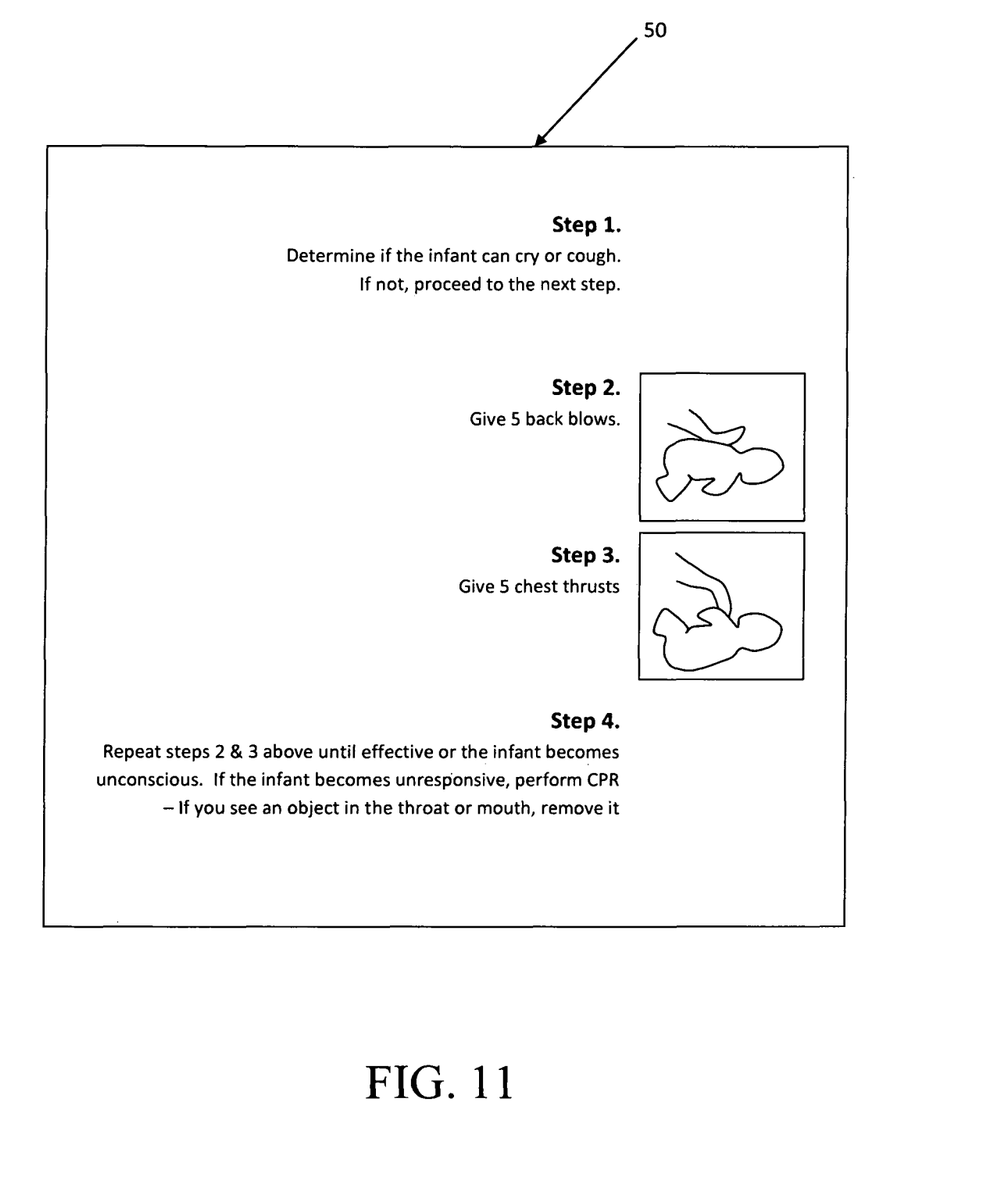
Figure 12:
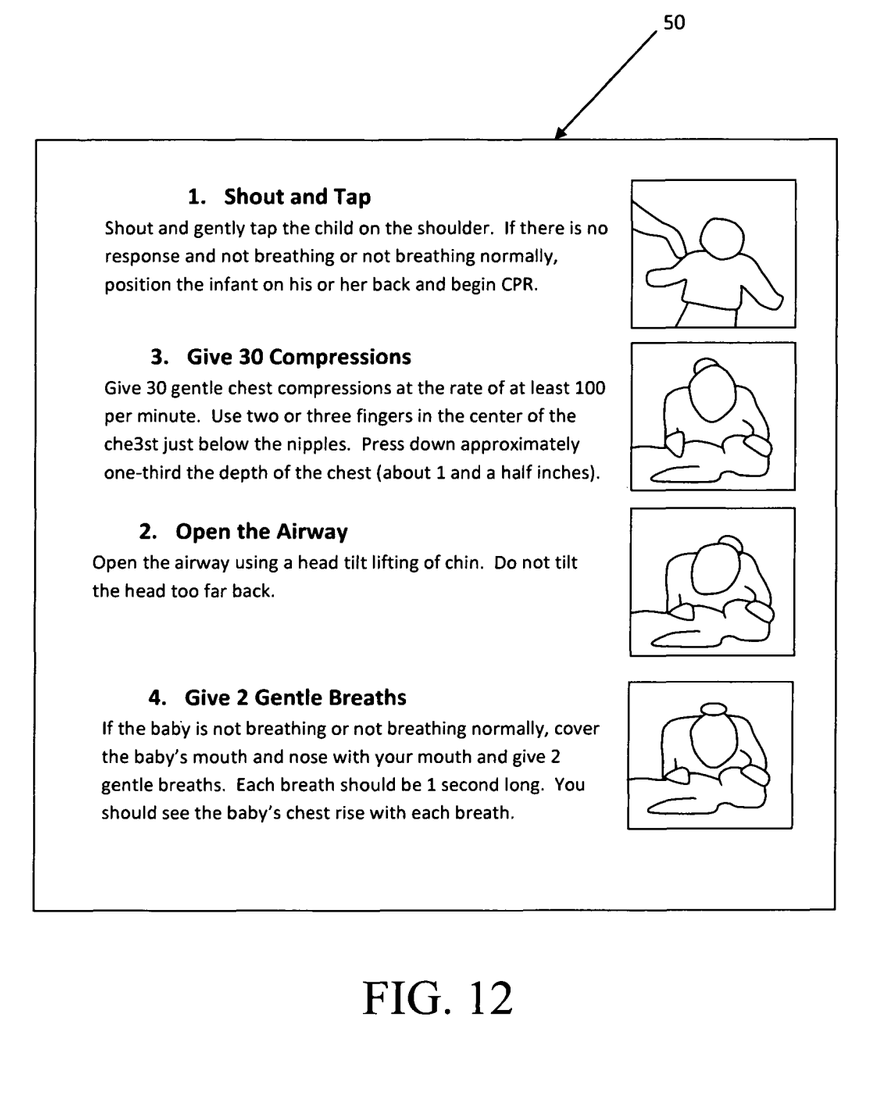

The shell component 14 preferably will provide insulating properties, and may include an insulating filling. However, in greater detail as shown in FIG. 6, the material of the shell component is anticipated as being thicker than 1 mm and less than 2 mm thick and adapted for positioning over both lateral side portions of the head. This shell is of a thickness suitable for maintaining the individual's head temperature within euthermic range.

The insulative cap 10 is divided into two halves, a first lateral portion and a second lateral portion, as divided and defined by the sagittal line of an individual's body.

Each lateral portion can have a highly visible and clearly demarcated area forming an indicia surface 50. Said indicia surface 50 provides a location for the affixing or printing of a detailed set of instructions of how to perform an emergency medical procedure. The indicia surface, and the instruction on how to perform the emergency medical procedure, are formed in an orientation axis generally perpendicular a frontal plane of the wearer. As best seen in FIG. 7-12, it is anticipated that the procedure will provide instructions on how to perform CPR, however other emergency medical procedures are anticipated, including but not limited to: neonatal resuscitation; tracheal intubation; laryngoscopy; defibrilation; foreign body retrieval; rapid sequence intubations, nasotracheal and transtracheal intubations; Needle cricothyroidotomy (Transtracheal jet ventilation) and surgical cricothyroidotomy; Transcutaneous and transvenous cardiac pacing; Needle and tube thoracostomy (Chest tube insertion); Procedural sedation and analgesia (Includes use of ketamine, propofol, thiopentone, iv benzodiazepines and potent opiates like morphine and fentanyl); Intra aortic balloon counterpulsation (IABP) device insertion; Pericardiocentesis; Focussed abdominal scan for trauma (FAST); Central venous cannulation (Internal jugular, subclavian, femoral and brachial); Regional anesthetic blocks (Includes digital, ankle and wrist blocks); Regular & plastic suturing and tendon repairs; Anterior and posterior nasal packing; Sengstaken-Blakemore/Minnesota tube insertion; Joint reductions and plaster application; Intraosseous line insertion; Diagnostic peritoneal lavage and abdominal paracentesis; Pleural fluid aspiration; Lumbar punctures; and Suprapubic catheterization. With these instructions at a convenient distance and oriented on a supine wearer to be perpendicular to a frontal plane of the wearer, the provider of CPR or the other emergency procedure is able to easily read the procedure from its position on the victim without the need to interrupt the procedure.

As shown with FIG. 6-12, the cap 10 provides and clearly instructs a third party, said third party could be an emergency responder or a lay person, with two types of emergencies medical procedures. Each respective procedure being highly visible while being deployed with you on a victim, and clearly shown on each respective first and second lateral portion. The preferred embodiment provides for instructing on each cap 10, the two different conventional techniques for performing CPR on an adult and on a child, each technique shown on one lateral side of the cap 10. With these instructions at a convenient distance and oriented perpendicular a frontal plane of the wearer, the provider or providers of the other emergency procedure can easily read one or more such procedures without the need to interrupt the procedures.

Figure 5:
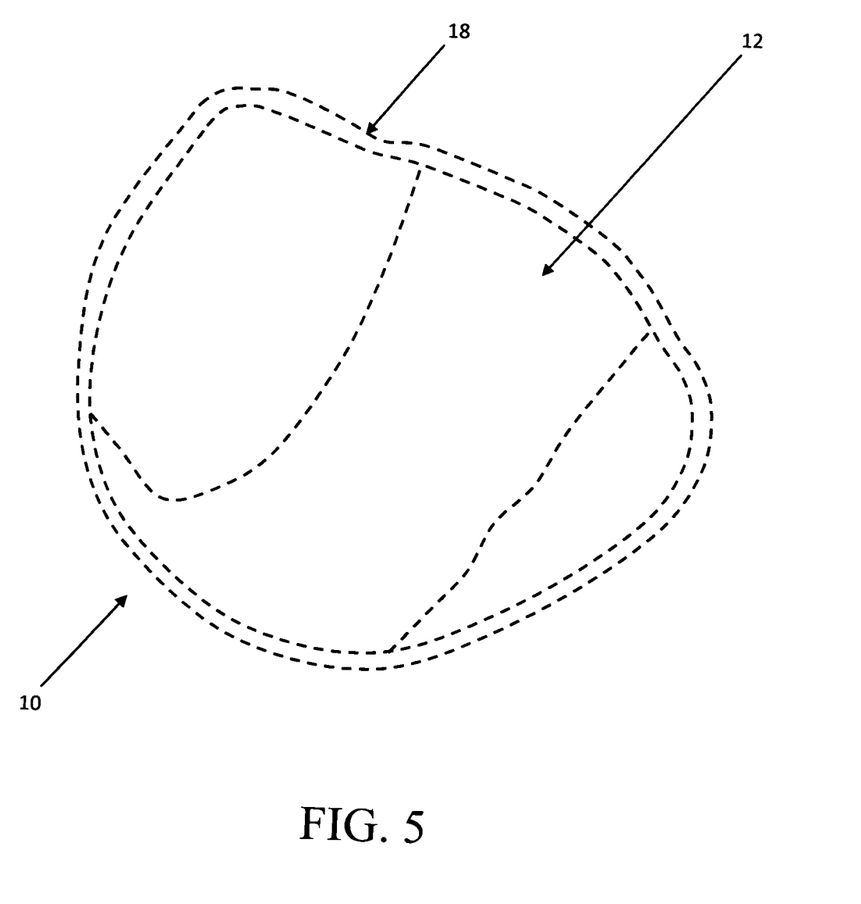
FIG. 5 is a reverse perspective showing the inner portion thereof.

As additionally anticipated and shown best in conjunction with FIG. 5-6, an additional insulating component 19 lining a portion of the inner surface 12.

Also illustrated in FIG. 1-6, the cap 10 will preferably cover below the mid point of the external auditory meatus bilaterally in addition to the rear portion of the head and upper neck region. The material covering the head has been designed to be in contact with the head in all covered areas so as to prevent a signification amount of air space between the head and the inner material covering the head. To accomplish this, the shell component is made from a pattern cut that is asymmetric from a section of the covering unit adapted for covering the front of the head and a section of the covering unit adapted for covering the rear of the head covering unit, such that the pattern cut has a concave pattern so as to emulate the shape of the front and rear of the head to prohibit the head covering unit from coming off of the head during use or while wearing.

It is preferred that the shell component comprise insulative properties. The shell component may further include an insulative filling.

It is additionally anticipated that an additional insulative component 19 lines a portion of the inner surface 12, as best shown in FIGS. 5 and 6. The insulative component 19 comprises material having a thickness greater than 2-mm at the areas adapted to cover the posterior, the anterior and the top portions of the head about a narrow width range about the sagittal centerline. The narrow width range is preferrably between ¼" to about 4", and is more preferrably between about 2" to about 4" in width. The insulative component 19 comprises material having a thickness less than 2-mm at the areas adapted to cover both of the lateral portions.

The insulative rescue cap 10 insulates a greater portion of the individual's head along approximately the central third, the anterior and the posterior portions.

As also illustrated in FIGS. 1-6, the insulative rescue cap 10 preferably covers below the midpoint of the external auditory meatus bilaterally in addition to the rear portion of the head and the upper neck region. The inner material that covers the head is designed to be in direct contact with the head to prevent the adverse effects a surgical cap having air gaps has on individual hypothermia. The direct contact is accomplished by means of a shell component made from a pattern cut asymmetrically from a section of the covering unit adapted to cover the front of the head and from a section of the covering unit adapted to cover the rear of the head. The pattern cut is concave to emulate the shape of the front and the rear of a head; it prohibits the insulative rescue cap 10 from falling off during surgery. The pattern forms a gap less than ¾ inch, preferably less than ½ inch and most preferably less than ¼ inch.

It is additionally contemplated that the insulative rescue cap 10 includes material that comprises a temperature regulating microfiber. The enclosed cap may further incorporate a chin strap attached to the lower right and the lower left aspects of the insulative rescue cap 10.

It is envisioned that the cap 10 is manufactured in various sizes, e.g., the standard sizes that include extra-small, small, medium, large, extra-large and the like. For a more efficient fit, the insulative rescue cap 10 may comprise the various standard sizes for different age ranges. Additionally, an adjustment or a take-up mechanism may be used to ensure a close-fit over the individual's head without pressing on the individual's head. The insulative rescue cap 10 laterally grips below the individual's external auditory meatus. Finally, it is envisioned that the material used in the head covering unit does not emit sparks nor is it static conductive. It may even be made of a fire retardant material.

Figure 1:
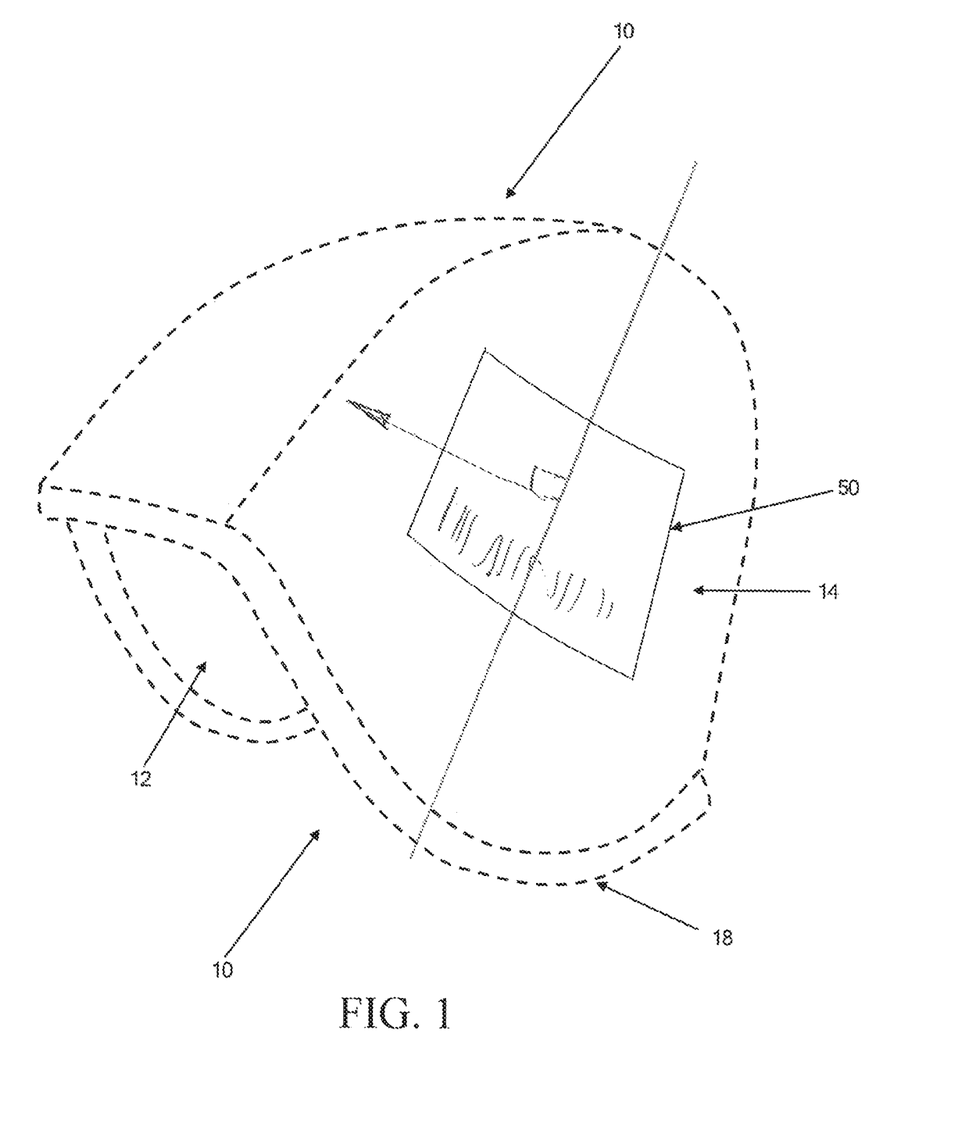
FIG. 1 is a perspective view of an insulative rescue cap to control individual body temperature providing instructions for emergency medical procedures according to a preferred embodiment of the present invention.
Figure 2:
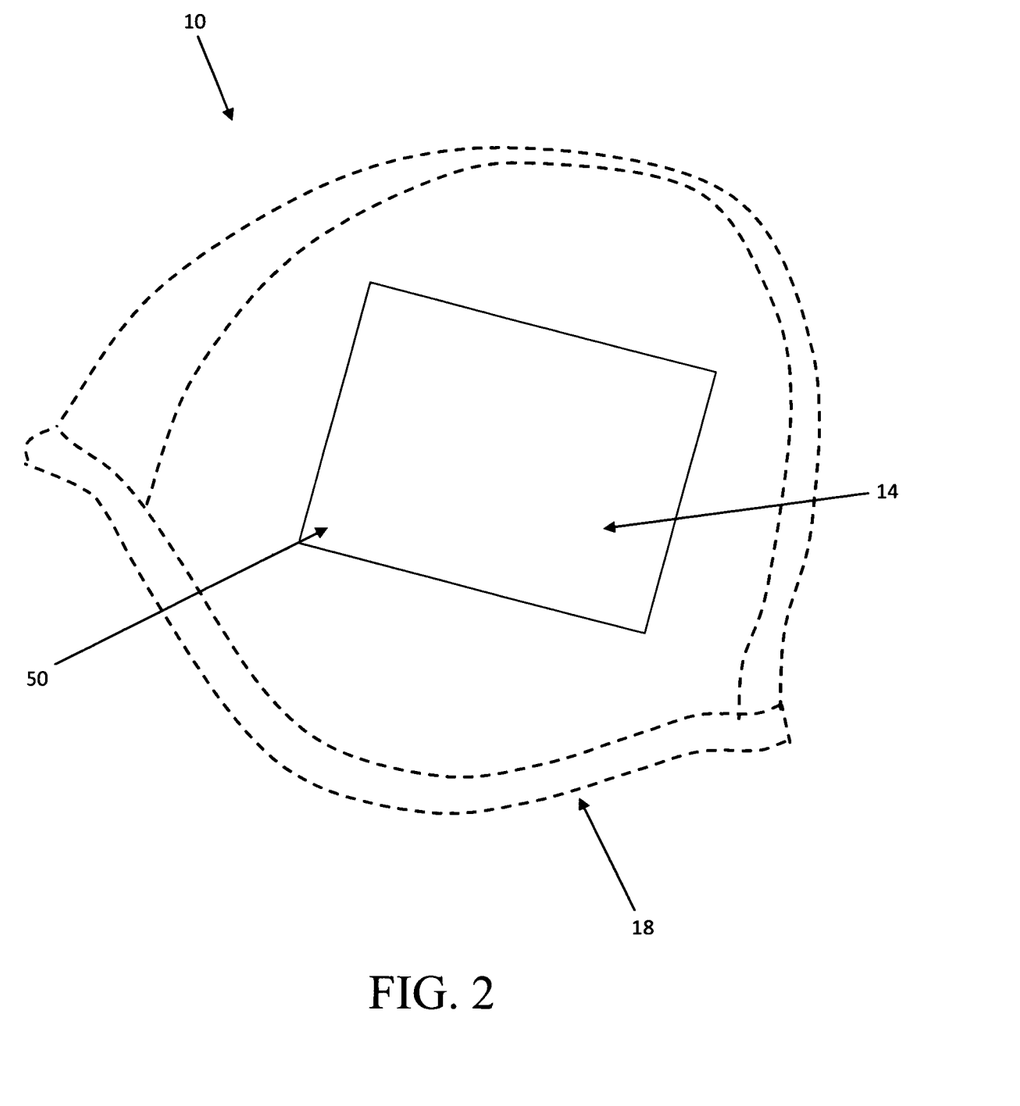
FIG. 2 is a side elevational view thereof.
Figure 3:
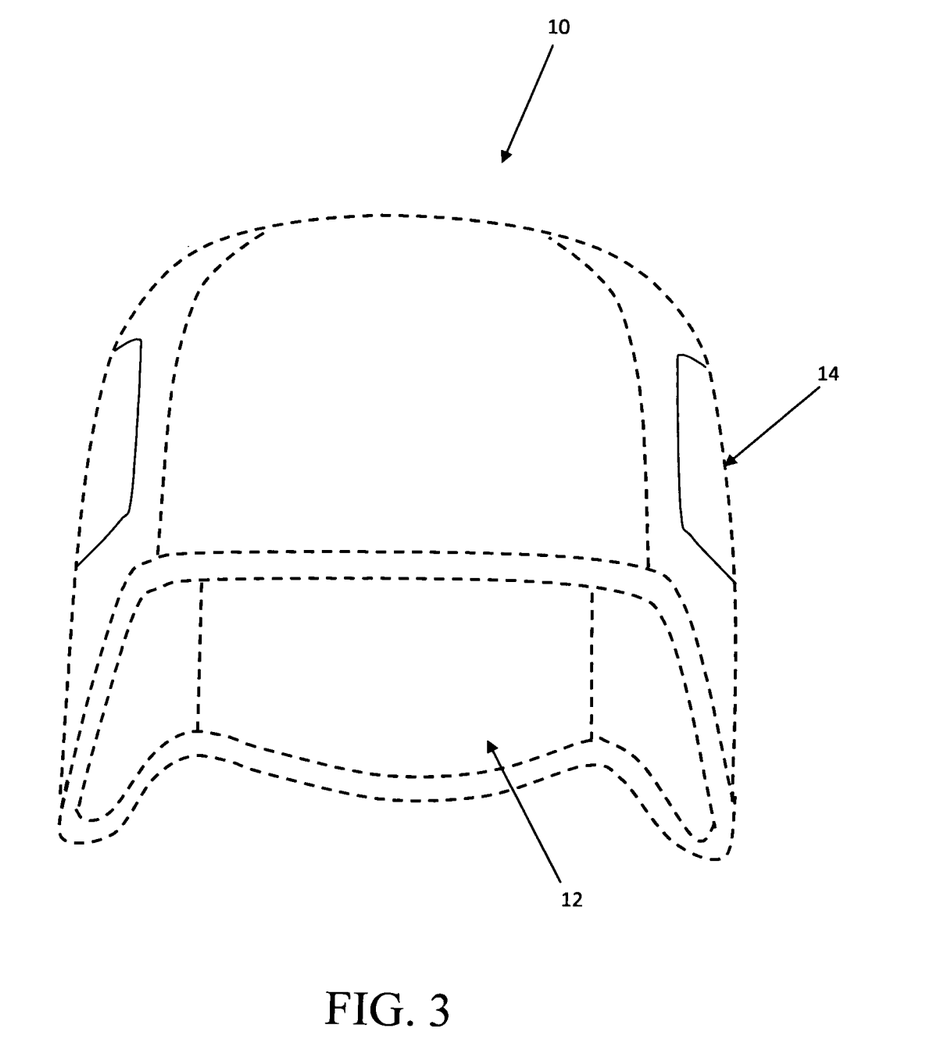
FIG. 3 is a front elevational view thereof.
Figure 4:
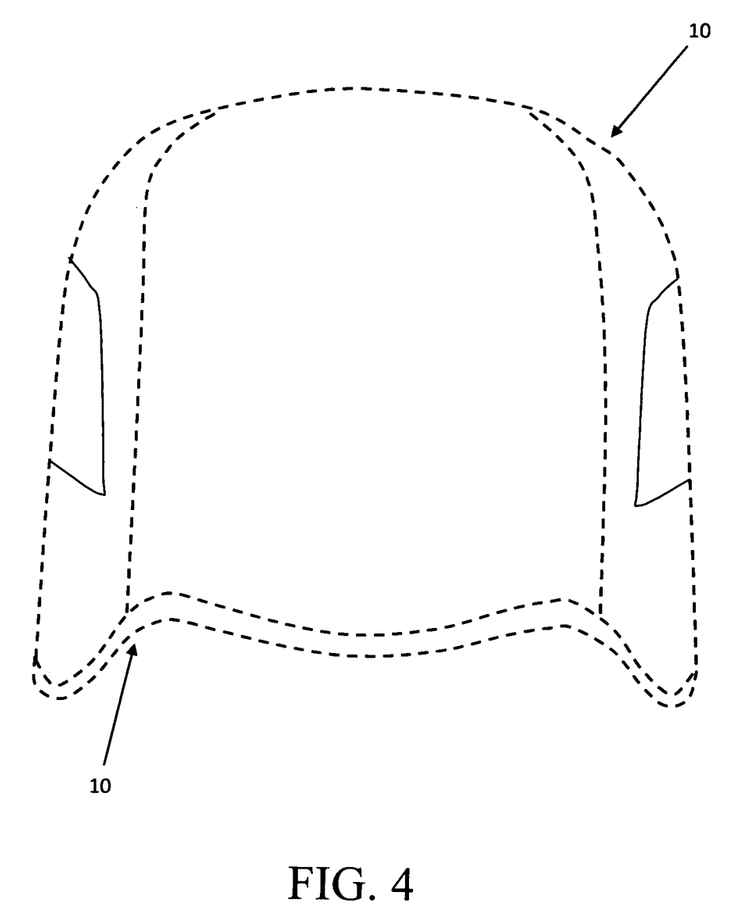
FIG. 4 is a rear elevational view thereof.

FIGS. 1-3 further illustrate that an embodiment of the disclosed invention can be made from a pattern cut asymmetrically from a section of the insulative rescue cap 10 adapted to cover the front of the head and a section of the insulative rescue cap 10 adapted to cover the rear of the head. Such a pattern is concave to emulate the shape of the front and the rear of the head and to prohibit the head covering unit from falling off during surgery. This embodiment includes a rear panel 20, a front panel 22, a top panel 24, and a medial and a lateral side panel 26 covering the mid point of the external auditory meatus bilaterally. The seams between the sides contain the external aspects to prevent the insulative rescue cap 10 from moving when it is laid on the posterior side, the medial or lateral side of the body.

It is additionally anticipated that the insulative rescue cap of the present invention is included in a conventional rescue kit utilized by United States Armed Forces such as the Coast Guard, or Emergency Responders.

2. Operation of the Preferred Embodiment

In operation, the present invention the covering unit 10 is anticipated for use in maintaining the head temperature and core body temperature within euthermic range during or after exposure to cold conditions that would ordinarily cause an individual to suffer hypothermia. The individual's head 70 is covered at the forehead, ears and a base having a back portion along a line where the head and neck meet. The covering unit 10 is closely fitted to the head 70 and maintains a close proximity throughout surgery. The head covering 10 provides further additional insulation at least a portion of a individual's head during surgery. The cap 10 is made such as to grippingly engage below the wearer's external auditory meatus bilaterally and conform closely to the individual's head.

The cap 10 provides instructions on at least one lateral side of how to perform emergency medical procedures, namely CPR. This allows for a lay or untrained person to perform CPR on a person who may be experiencing hypothermia in an attempt to prevent cardiac arrest.

The foregoing descriptions of the specific embodiments of the present invention have been presented for the purposes of illustration and description only. They are not intended to be exhaustive nor are they intended to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and its various embodiments with various modifications as are suited to the particular use contemplated. It is intended that the scope of the invention be defined by the Claims appended hereto and their equivalents. Therefore, the scope of the invention is to be limited only by the following claims.

Having thus described the invention, what is claimed as new and desired and to be secured by Letters Patent is as follows:

1. A insulative rescue cap to maintain a individual's optimal body temperature during an emergency rescue procedure comprising:

a shell component having an inner surface to closely fit contours of a patient's head and ears and preventing open air space between said head and said inner surface, said shell component having a lower edge, said inner surface attached to said insulative element and said shell component further comprising:

a first side panel;

a second side panel;

an instruction indicia area formed on at least one of said first side panel or said second side panel, said instruction indicia area forming an orientation axis generally perpendicular a frontal plane of said individual; and a top center panel that forms a front, a center and a rear connected to said first side panel and said second side panel;

said insulative element lining only a portion of the inner surface along the top center panel from a front terminus to a rear terminus symmetrically about a vertical centerline;

a gripping element to grip said individual's head in a manner that impedes said insulative rescue cap from falling off said individual's head during an emergency procedure; and an instruction indicia comprising teaching how to perform an emergency medical procedure, said instruction indicia incorporated on said instruction indicia area and having a reading orientation that is generally said instruction indicia area positioned generally parallel with the orientation axis.

2. The insulative rescue cap in claim 1, further comprising:

an instruction area indicia formed on both said first side panel and said second side panel;

each said instruction indicia area forming an orientation axis generally perpendicular a frontal plane of a wearer; and an instruction indicia incorporated on each said instruction indicia area.

3. The insulative rescue cap in claim 2, wherein said instruction indicia providing a teaching selected from a group consisting of: a standard adult CPR technique; a standard child CPR technique neonatal resuscitation; tracheal intubation; laryngoscopy; defibrilation; foreign body retrieval; rapid sequence intubations, nasotracheal and transtracheal intubations; Needle cricothyroidotomy (Transtracheal jet ventilation) and surgical cricothyroidotomy; Transcutaneous and transvenous cardiac pacing; Needle and tube thoracostomy (Chest tube insertion); Procedural sedation and analgesia (Includes use of ketamine, propofol, thiopentone, iv benzodiazepines and potent opiates like morphine and fentanyl); Intra aortic balloon counterpulsation (IABP) device insertion; Pericardiocentesis; Focussed abdominal scan for trauma (FAST); Central venous cannulation (Internal jugular, subclavian, femoral and brachial); Regional anesthetic blocks (Includes digital, ankle and wrist blocks); Regular & plastic suturing and tendon repairs; Anterior and posterior nasal packing; Sengstaken-Blakemore/Minnesota tube insertion; Joint reductions and plaster application; Intraosseous line insertion; Diagnostic peritoneal lavage and abdominal paracentesis; Pleural fluid aspiration; Lumbar punctures; and Suprapubic catheterization.

4. The insulative rescue cap of claim 3, wherein said shell component has a thickness of between 1-mm and 2-mm and said insulative element comprises material having a thickness greater than 2-mm.

5. The insulative rescue cap of claim 2, wherein said insulative element has a lateral width within a range of between ¼" to 4".

6. The insulative rescue cap of claim 2, wherein said shell component has a thickness of between 1-mm and 2-mm and said insulative element comprises material having a thickness greater than 2-mm.

7. The insulative rescue cap in claim 1, wherein said instruction indicia providing a teaching selected from a group consisting of: a standard adult CPR technique; a standard child CPR technique neonatal resuscitation; tracheal intubation; laryngoscopy; defibrilation; foreign body retrieval; rapid sequence intubations, nasotracheal and transtracheal intubations; Needle cricothyroidotomy (Transtracheal jet ventilation) and surgical cricothyroidotomy; Transcutaneous and transvenous cardiac pacing; Needle and tube thoracostomy (Chest tube insertion); Procedural sedation and analgesia (Includes use of ketamine, propofol, thiopentone, iv benzodiazepines and potent opiates like morphine and fentanyl); Intra aortic balloon counterpulsation (IABP) device insertion; Pericardiocentesis; Focussed abdominal scan for trauma (FAST); Central venous cannulation (Internal jugular, subclavian, femoral and brachial); Regional anesthetic blocks (Includes digital, ankle and wrist blocks); Regular & plastic suturing and tendon repairs; Anterior and posterior nasal packing; Sengstaken-Blakemore/Minnesota tube insertion; Joint reductions and plaster application; Intraosseous line insertion; Diagnostic peritoneal lavage and abdominal paracentesis; Pleural fluid aspiration; Lumbar punctures; and Suprapubic catheterization.

8. The insulative rescue cap of claim 7, wherein said insulative element has a lateral width within a range of between ¼" to 4".

9. The insulative rescue cap of claim 7, wherein said shell component has a thickness of between 1-mm and 2-mm and said insulative element comprises material having a thickness greater than 2-mm.

10. The insulative rescue cap of claim 1, wherein said insulative component covers a rear portion of said insulative rescue cap is configured to cover said head and the upper neck region of said individual.

11. The insulative rescue cap of claim 10, wherein said shell component has a thickness of between 1-mm and 2-mm and said insulative element comprises material having a thickness greater than 2-mm.

12. The insulative rescue cap of claim 1, wherein said shell component is flexible sufficient to expand to fit different sized heads.

13. The insulative rescue cap of claim 12, said shell component has a thickness of between 1-mm and 2-mm and said insulative element comprises material having a thickness greater than 2-mm.

14. The insulative rescue cap of claim 1, wherein said insulative element has a lateral width within a range of between ¼" to 4".

15. The insulative rescue cap of claim 14, wherein said shell component has a thickness of between 1-mm and 2-mm and said insulative element comprises material having a thickness greater than 2-mm.

16. A method for providing instructions for performing of an emergency rescue procedure to a patient suffering from hypothermia, said method comprising the steps:

a. obtaining an insulative rescue cap as described in claim 1;

b. positioning said insulative rescue cap on a victim's head cover below the mid point of the external auditory meatus bilaterally in addition to the rear portion of the head and upper neck region in a manner such that the material covering the head is in contact with the head in all covered areas so as to prevent a signification amount of air space between the head and the inner material covering the head;

wherein said instruction indicia is capable of being directly viewable by a person performing said emergency medical procedure while said insulative rescue cap is positioned properly upon the head of a user.

17. The method of claim 16, wherein both said first lateral side and said second lateral side at least one lateral side each have an area supporting an instruction indicia capable of displaying instructions teaching how to perform said emergency medical procedure.

18. The method of claim 17, comprising the further steps of performing said emergency medical procedure.

19. The method of claim 18, wherein said emergency medical procedure comprises a standard adult CPR technique.

* * * * *